United States Patent
Rollmann et al.

(10) Patent No.: US 10,590,992 B2
(45) Date of Patent: Mar. 17, 2020

(54) PROCESS FOR PRODUCING A ROLLING BEARING CAGE, IN PARTICULAR FOR LARGE ROLLING BEARINGS, AND APPARATUS FOR CARRYING OUT THE PROCESS

(71) Applicant: THYSSENKRUPP ROTHE ERDE GMBH, Dortmund (DE)

(72) Inventors: Joerg Rollmann, Lippstadt (DE); Stefan Schnieder, Lippstadt (DE); Markus Leonhard, Bielefeld (DE); Reinhard Juergens, Lippstadt (DE)

(73) Assignee: THYSSENKRUPP ROTHE ERDE GMBH, Dortmund (DE)

( * ) Notice: Subject to any disclaimer, the term of this patent is extended or adjusted under 35 U.S.C. 154(b) by 0 days.

(21) Appl. No.: 14/382,137

(22) PCT Filed: Feb. 27, 2013

(86) PCT No.: PCT/EP2013/053932
§ 371 (c)(1),
(2) Date: Aug. 29, 2014

(87) PCT Pub. No.: WO2013/127852
PCT Pub. Date: Sep. 6, 2013

(65) Prior Publication Data
US 2015/0024144 A1    Jan. 22, 2015

(30) Foreign Application Priority Data
Feb. 29, 2012  (DE) ........................ 10 2012 101 649

(51) Int. Cl.
*F16C 33/64* (2006.01)
*F16C 33/42* (2006.01)
(Continued)

(52) U.S. Cl.
CPC ............ *F16C 33/64* (2013.01); *F16C 33/425* (2013.01); *F16C 33/445* (2013.01); *F16C 19/06* (2013.01); *F16C 2300/14* (2013.01)

(58) Field of Classification Search
CPC .... B05D 3/0218; B05D 3/0245; F16C 33/445
(Continued)

(56) References Cited

U.S. PATENT DOCUMENTS 2,024,906 A * 12/1935 Bennett ................. H05B 6/362
219/607
3,573,953 A    4/1971 Michel
(Continued)

FOREIGN PATENT DOCUMENTS

DE    1577915 A1    3/1970
DE    1915330 A1 * 10/1970 .......... F16C 11/0614
(Continued)

OTHER PUBLICATIONS

Updated Machine Translation of Leuze DE1915330A1 (1970) (Year: 1970).*
(Continued)

*Primary Examiner* — Jose Hernandez-Kenney
(74) *Attorney, Agent, or Firm* — Lathrop GPM LLP

(57) ABSTRACT

The invention relates to a process for producing a rolling bearing cage, in particular for large rolling bearings, wherein a steel strip with openings for in each case one rolling body is provided and bent to form a ring, wherein, for thermal coating with a thermoplastic powder, the ring is then heated to a temperature above a minimum coating temperature, wherein the ring is then dipped into a fluidized bed comprising the thermoplastic powder, wherein, during the residence time of the ring in the fluidized bed, plastic powder adheres to the ring, melts and forms a continuous coating, and wherein the ring is removed from the fluidized bed after
(Continued)

the coating. The invention also relates to an apparatus for carrying out the process.

8 Claims, 4 Drawing Sheets

(51) Int. Cl.
*F16C 33/44* (2006.01)
*F16C 19/06* (2006.01)

(58) Field of Classification Search
USPC .............................. 427/182, 185, 522, 543
See application file for complete search history.

(56) References Cited

U.S. PATENT DOCUMENTS

| | | | |
|---|---|---|---|
| 4,806,388 A | | 2/1989 | Mochizuki |
| 4,911,949 A | * | 3/1990 | Iwase ................ B05D 1/24 118/DIG. 5 |
| 5,860,747 A | * | 1/1999 | Wan ................ F16C 33/445 384/463 |
| 6,713,736 B2 | * | 3/2004 | Suzuki ................ F26B 3/347 118/622 |
| 7,205,027 B2 | * | 4/2007 | Brosemer ............... B05D 3/12 427/180 |
| 2003/0063825 A1 | * | 4/2003 | Ooitsu ................ F16C 19/163 384/527 |
| 2006/0057390 A1 | * | 3/2006 | Kittle ................ B05O 19/025 428/411.1 |

FOREIGN PATENT DOCUMENTS

| | | | | |
|---|---|---|---|---|
| DE | 3041355 | A1 | | 5/1981 |
| DE | 19731892 | A1 | | 1/1999 |
| DE | 19751003 | A1 | | 3/1999 |
| DE | 102008026893 | A1 | | 12/2009 |
| DE | 102009031722 | A1 | * | 1/2011 .......... F16C 33/3887 |
| FR | 1302611 | A | | 8/1962 |
| GB | 1475295 | A | | 6/1977 |
| GB | 2062128 | A | | 5/1981 |
| GB | 2103307 | A | | 8/1981 |
| JP | S62-065775 | A | | 3/1987 |
| JP | 2002-227845 | A | | 8/2002 |
| JP | 2011-110464 | A | | 6/2011 |

OTHER PUBLICATIONS

Hand Translation of DE1915330A1 (Year: 1970).*
German Language International Search Report for International patent application No. PCT/EP2013/053932; dated May 29, 2013.
English Translation of International Search Report for International patent application No. PCT/EP2013/053932; dated May 29, 2013.
Written Opinion of the International Searching Authority for PCT/EP2013/053932.
English Abstract of German patent application publication No. DE102009031722A1.
English Abstract of US Counterpart patent No. 3573953 to German patent No. DE1577915A1. (Note: English Abstract of DE1577915A1 is not available.).
English Abstract of German patent No. DE1915330A1.
English Abstract of French patent No. FR1302611A.
English Abstract of German patent application publication No. DE102008026893A1.
English Abstract of German patent No. DE19731892A1.
English Abstract of GB counterpart publication No. GB2062128A to German patent No. DE3041355A1. (Note: English Abstract of DE3041355A1 is not available.).
English Abstract of German patent No. DE19751003A1.
English Translation of International Preliminary Report on Patentability and Written Opinion of the International Searching Authority for PCT/EP2013/053932, dated Sep. 12, 2014.
English translation of the Abstract of JP 2002-227845 (A).
English translation of the Abstract of JP 2011-110464 (A).
English translation of the Abstract of JP S62-065775 (A).
Indian Appln. No. 6414/CHENP/2014, Examination Report dated Feb. 4, 2019, six pages.

* cited by examiner

PROCESS FOR PRODUCING A ROLLING BEARING CAGE, IN PARTICULAR FOR LARGE ROLLING BEARINGS, AND APPARATUS FOR CARRYING OUT THE PROCESS

CROSS REFERENCE TO RELATED APPLICATIONS

This application is a U.S. National Stage Entry of International Patent Application Serial Number PCT/EP2013/053932, filed Feb. 27, 2013, which claims priority to German patent application no. DE 102012101649.6, filed Feb. 29, 2012.

FIELD

The invention relates to a process for producing a rolling bearing cage, in particular for large rolling bearings, and to an apparatus for carrying out the process.

BACKGROUND

The rolling bearing cage is provided to keep the rolling bodies, usually balls according to the present invention, at a uniform spacing with respect to one another. According to the prior art, corresponding cages can be formed as an open or closed ring or from a multiplicity of segments.

The rolling bearing cage should be suitable in particular for large rolling bearings, such that the diameter of the cage is then at least one meter. In the case of large rolling bearings, there are restrictions with regard to the production of suitable rolling bearing cages on account of the size alone. Thus, injection-molded plastics cages are uneconomical in view of the costs for corresponding injection molds and the usual quantity of large rolling bearings. Although cages made from simple plastics strips are cost-effective to manufacture, they have only very low strength in the circumferential direction and are therefore not suitable for many applications. In this case, it should also be borne in mind that, particularly in the case of large rolling bearings, subsequent replacement of the bearing is associated in part with very high costs and very great effort.

DE 30 41 355 A1 discloses a cage for a conventional ball bearing having an inner race, an outer race and a plurality of balls arranged in between, wherein the cage is formed from two sheet metal parts which each have a coating of plastics material. The production of such a cage formed from two shaped and coated sheet metal strips is complicated and not suitable for large rolling bearings. Since the coating is initially applied to the punched parts in an electrostatic process or a fluid bed process, transitions at which an increased risk of damage can occur remain after the punched parts have been connected. Provided as the coating is a thermoplastic, in particular polyamide, in order to protect the contact surfaces of the cage with the balls and the inner and the outer race from wear and to reduce the coefficient of friction.

DE 197 51 003 A1 discloses a process and an apparatus for coating workpieces with a pulverulent, granular, liquid or pasty coating medium, wherein the coating medium is applied in a fluidized bed. Excess coating medium is removed prior to the final melting and adhering to the workpiece. Therefore, a complicated procedure is necessary. The process and the apparatus described are provided in particular for endless workpieces which are then subsequently brought into their final form.

BRIEF DESCRIPTION OF THE DRAWINGS

The present disclosure is described in detail below with reference to the attached drawing figures, wherein.

DETAILED DESCRIPTION

Figure 1:
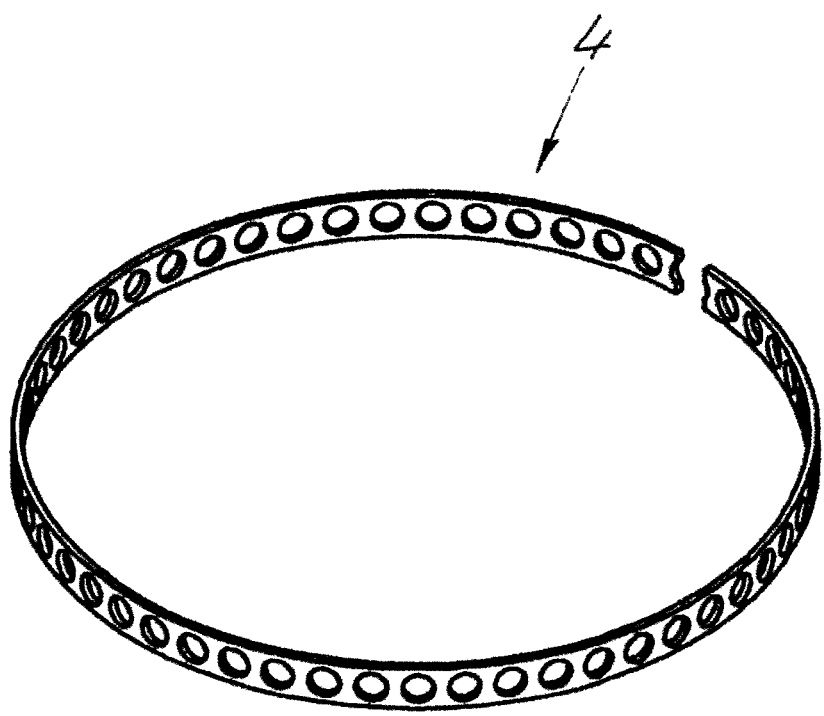
FIG. 1 is perspective view of an embodiment of a cage of the present disclosure.

The present invention is based on the object of specifying a process and an apparatus for producing a rolling bearing cage, it being possible by way of said process and apparatus to provide a sufficiently strong but also wear-resistant rolling bearing cage in a simple manner in particular also for large rolling bearings.

In order to achieve this object, provision is made according to the invention of a process for producing a rolling bearing cage, wherein a steel strip having openings for in each case one rolling body is provided and bent to form a ring, wherein, for thermal coating with a thermoplastic powder, the ring is subsequently heated to a temperature above a minimum coating temperature, wherein the ring is subsequently dipped in a fluidized bed containing the thermoplastic powder, wherein, during the residence time of the ring in the fluidized bed, plastics powder adheres to the ring, melts and forms a continuous coating, and wherein the ring is removed from the fluidized bed after the coating.

According to the invention, first of all a steel strip is provided and bent to form a ring. The ends of the steel strip can in the process be welded or be located loosely in front of one another in order to form a closed or an open cage. The ring in this case already has the form of the rolling bearing cage and is then intended to be coated in this final shape with a coating made of a thermoplastic powder. To this end, the ring is heated to a temperature which is required for a plastics powder to adhere to the ring and melt. To this end, the ring is dipped into a fluidized bed containing thermoplastic powder, it being necessary for said fluidized bed to be formed correspondingly in a sufficiently large manner to be able to accommodate the entire ring.

During the residence time of the ring in the fluidized bed, the plastics powder adheres to the ring and melts, thereby forming a continuous, closed layer. As residence time of the ring in the fluidized bed increases, the layer thickness also increases. Once the ring has been removed from the fluidized bed, no further heating, shaping or the like is necessary.

However, within the context of the invention, it is possible to cool the ring after it has been removed from the fluidized bed, for example by way of a blower, in order to solidify the coating and to be able to easily handle and store the finished ring. According to the process according to the invention, a very uniform coating that adheres well at all points is achieved over the entire ring.

The ring is preferably heated to the temperature necessary for the coating by an alternating electromagnetic field of an induction coil. Heating by an induction coil is easily possible even in the case of large rolling bearings having a cage diameter of more than one meter. With regard to heating by induction, there is also the advantage that the steel strip provided has already been bent to form a ring. Thus, the induction coil can also be formed easily in an annular manner and be arranged concentrically with the ring. With a concentric arrangement of the induction coil inside or outside the ring, there is a regular gap and thus particularly uniform heating.

Since the ring is formed from a metal strip, it can also be heated in a short time by the induction coil, with the result that, during the subsequent coating in the fluidized bed, the adhesion of the plastics powder is favored. In this case, it should be noted that increased chemical activity occurs with a heated surface, and this can impair adhesion on account of accumulation of foreign substances, oxidation or the like. Compared with oven heating, wherein usually circulation of the oven atmosphere takes place, the ring is also less exposed to dust or similar foreign bodies. Finally, heating by way of the induction coil can also be integrated well into line production, in which a plurality of rolling bearing cages are manufactured one immediately after another.

The induction coil having one or more turns is expediently arranged in a heating zone which is formed close to the fluidized bed, in particular immediately above the fluidized bed. Temperature losses during the transport of the ring can be avoided in this way. However, it may be expedient to configure the induction coil in a movable manner in order to be able to move it into and out of the heating zone. Thus, it is for example possible to guide the induction coil, which in the case of a large rolling bearing has a considerable size, on rails.

Even though, for reasons of energy efficiency, temperature losses should be kept as low as possible during or after heating, it may be expedient in the context of the invention to provide a pause, which serves to make the temperature uniform, between the heating of the ring and the dipping into the fluidized bed. With regard to induction heating and making the temperature uniform, it is advantageous if the metal strip bent to form a ring is closed at its ends by welding or the like in the context of the process according to the invention.

The temperature selection is particularly important in the context of the invention, because at an excessively low temperature the powder adhering to the ring in the fluidized bed can be melted only to an insufficient extent. By contrast, at an excessively high temperature there is the risk of the plastics material becoming too thin, resulting in a nonuniform distribution of the coating on account of gravitational force. Finally, the temperature must be selected on the basis of the thermoplastic provided as the coating, wherein a certain cooling during the coating process within the fluidized bed also has to be taken into consideration. The preferred inductive heating that is provided can, on the one hand, take place very quickly, for example in a few seconds, wherein, on the other hand, precise temperature control taking the supplied power into consideration is possible.

Within the context of the invention, it is also possible to move the ring in the heating zone during heating and/or in the fluidized bed during coating, in order for the heating and the coating to be even more uniform. For example, the ring can be swiveled, rotated or shaken, with a combination of these movements also being possible. Whereas a nonuniform distribution of the plastics powder can be compensated in the fluidized bed by swiveling or rotating, shaking has the effect that only as much plastics powder adheres to the ring as can also be immediately melted. Local accumulations of material, clumping on the ring or the like can thus be reliably avoided Shaking thus contributes to even more uniform coating, although the buildup of layers can be slowed under certain circumstances.

The steel strip provided for bending the ring can be a simple strip made of sheet metal, wherein the openings are then produced by punching, cutting, in particular thermal cutting, or boring.

In order to achieve coating by melting, use should be made of a thermoplastic powder. Expediently, use is made in this case of a polymer or a polymer mixture which is characterized by good resistance and a low coefficient of friction. For example plastics powders based on polyamide (PA) or polyether ketone are suitable. In particular, polyether ether ketone (PEEK) is characterized by good thermal and chemical resistance.

In the context of the invention, use can also be made of polymer mixtures or polymers reinforced with particles. In this case, it is possible to already provide corresponding mixtures in the individual powder particles or to keep a powder mixture ready in a particularly simple manner. Thus, it is for example conceivable to provide, in addition to the thermoplastic powder, reinforcing materials such as fibers or friction-reducing particles in the fluidized bed. It is also conceivable to provide, in addition to a thermoplastic powder based on polyamide or polyether ketone, friction-reducing particles, for example fluoropolymer particles, in the fluidized bed. As a result of the uniform distribution of the powder in the fluidized bed, different materials are also distributed on the ring and are connected together or incorporated into the plastics matrix by the melting of the thermoplastic powder.

The thickness of the coating is expediently between 0.4 mm and 1.3 mm. The layer thickness can be modified in a simple manner by the residence time of the ring in the fluidized bed.

Prior to the coating and preferably after the bending of the steel strip to form the ring, cleaning or some other surface treatment can be provided in the context of the invention. It is particularly advantageous to temper the surface of the ring with a particle jet, for example processing by sandblasting or blasting with corundum. In the context of such processing, soiling and surface material defects can be eliminated. Furthermore, a microstructure is produced on the surface, this being particularly suitable for receiving a coating Finally, by blasting the surface, the strength and resistance can also be further improved.

In order to improve the adhesion of the coating, the ring can be provided with an adhesion promoter layer as primer prior to the actual coating. In particular adhesion promoters based on organic solvents and synthetic polymers, which are preferably already applied prior to heating, are suitable.

The subject of the invention is also an apparatus for carrying out the described process, wherein this apparatus has a heating zone, a fluidized bed containing thermoplastic powder and a height-adjustable holding device for receiving rings, wherein the rings are lowerable into the fluidized bed by means of the holding device. The ring to be coated is secured to the holding device, which is height-adjustable between the heating zone and the fluidized bed located beneath the latter. At least those parts of the holding device that hold the ring and are in the form of grippers, arms or the like are formed preferably from an electromagnetically neutral material, that is to say a nonmagnetic and nonconductive material. The ring is preferably held at its axial end faces.

The invention is explained by way of figures which illustrate merely possible exemplary embodiments.

Figure 2:
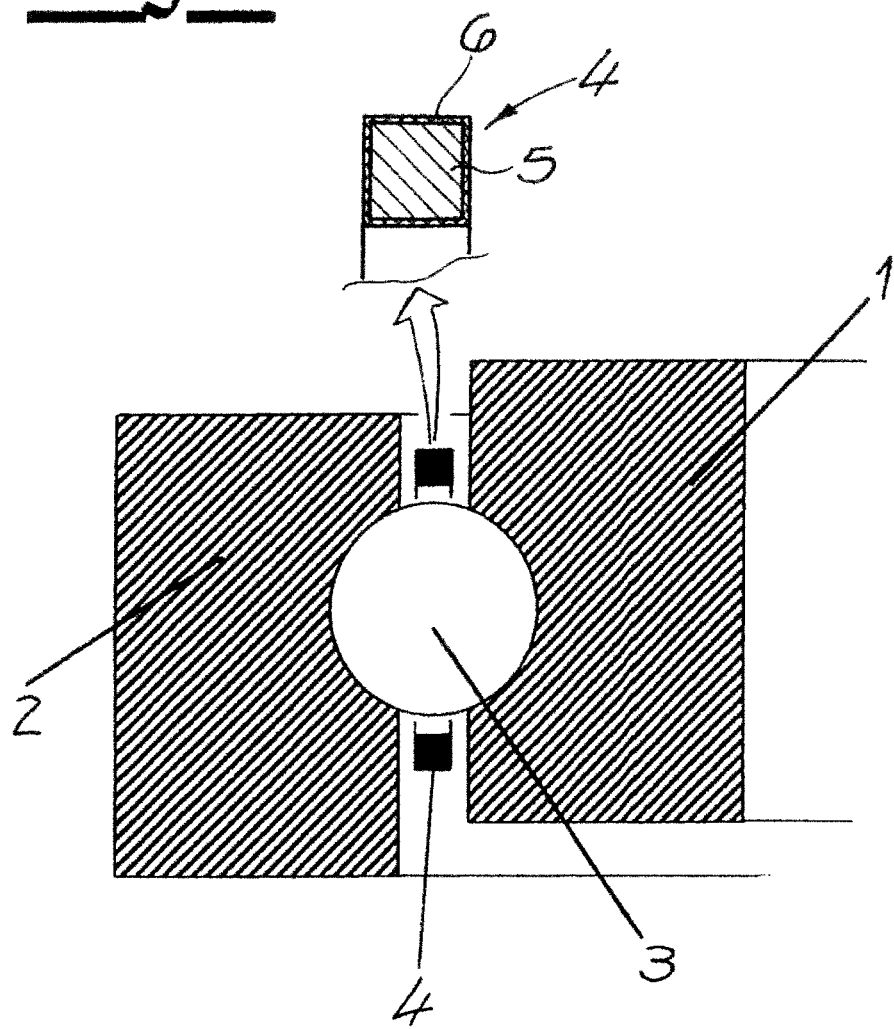
FIG. 2 is side cross section detail view of an embodiment of a large rolling bearing of the present disclosure.

FIG. 2 shows a highly schematic view of a cross section through a large rolling bearing which has an inner race 1, an outer race 2 and balls 3 arranged in between as rolling bodies. The balls 3 rotatably support the inner race 1 with respect to the outer race 2, wherein the balls 3 are kept at a spacing in a known manner by a rolling bearing cage 4. FIG. 1 shows a detail view of the rolling bearing cage 4.

FIG. 2 indicates that the rolling bearing cage 4 consists of a metallic main body in the form of a ring 5 and a coating 6 made of thermoplastic arranged thereon. While the ring 5 gives the rolling bearing cage 4 great stability, the coating 6 reduces the friction and provides effective protection against wear. In particular polyamide (PA) and polyether ketone, such as PEEK, having a layer thickness of between 0.4 mm and 1.3 mm are suitable as the coating 6.

Figure 3:
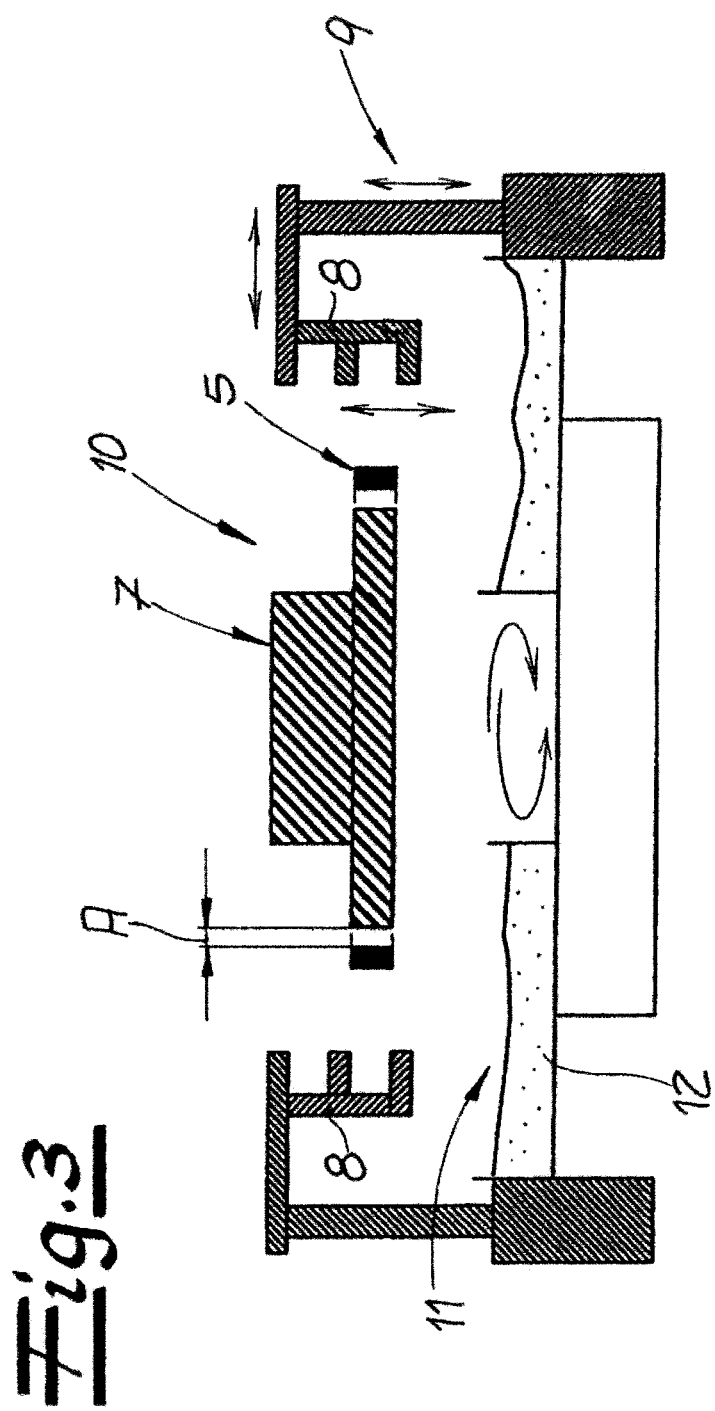
FIG. 3 is a side cross section schematic view of an embodiment of an apparatus of the present disclosure for producing a coated rolling bearing cage.
Figure 4:
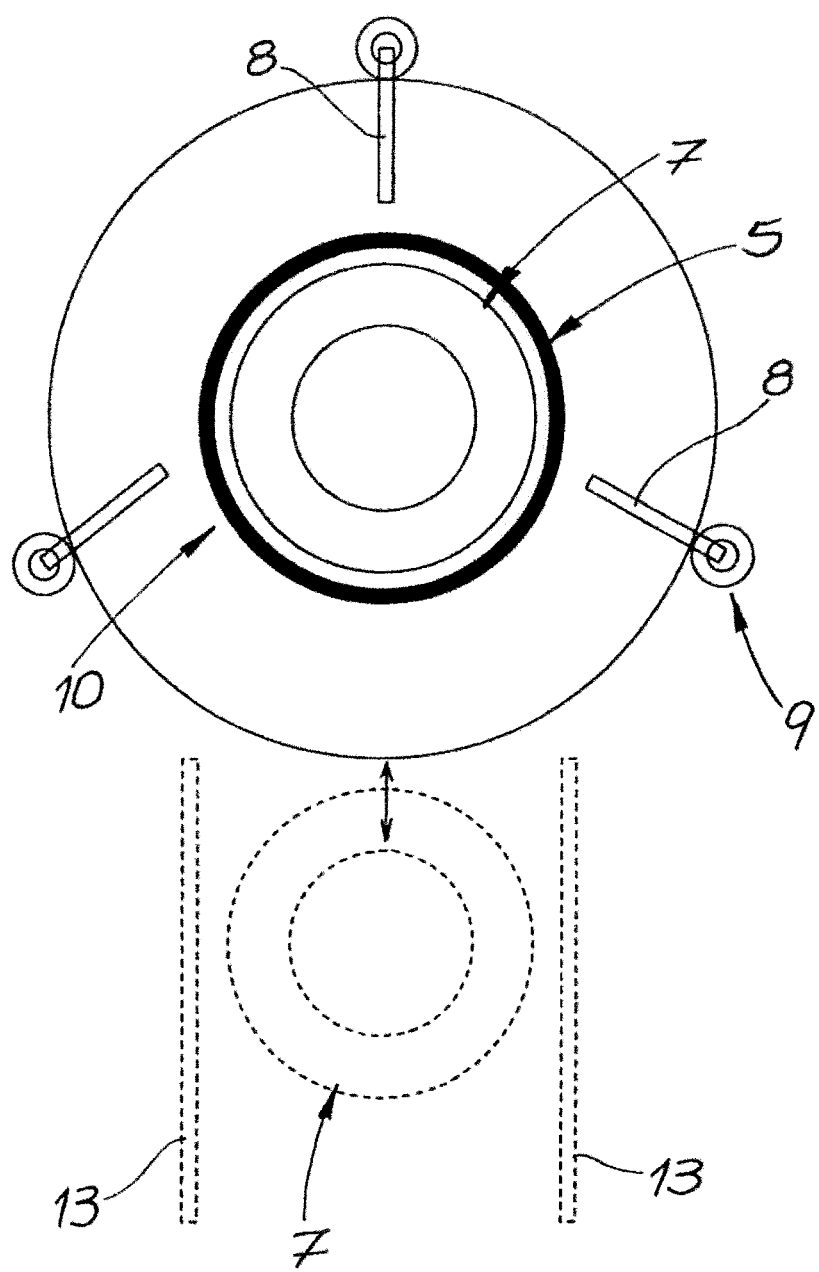
FIG. 4 is a plan view of the apparatus of FIG. 3.

FIGS. 3 and 4 show a possible configuration of an apparatus for coating the ring 5. In order to heat the ring 5 prior to coating, provision is made of an annular induction coil 7 which is arranged in a centered manner with a regular coupling spacing A within the ring 5. The ring 5 is held with the aid of arms 8 of a holding device 9. The arms 8 of the holding device 9 are radially movable both in the vertical direction and in the horizontal direction.

After heating, the ring 5 can be lowered with the aid of the height-adjustable holding device 9 into a fluidized bed 11 which is arranged beneath the heating zone 10 and in which a plastics powder 12 is present.

Heating is carried out such that the ring 5 is heated to a temperature above a minimum coating temperature. During the residence time of the ring 5 in the fluidized bed 11, the thermoplastic powder 12 adheres to the ring 5 and melts. In this way, the above-described continuous coating 6 is formed.

Following the plastics coating, the finished rolling bearing cage 4 consisting of the internally located ring 5 and the coating 6 arranged thereon is removed from the fluidized bed 11.

FIG. 4 additionally illustrates rails 13 on which the induction coil 7 can be moved into and out of the heating zone 10.

The invention claimed is:

1. A process for producing a rolling bearing cage for a rolling bearing, comprising:
    forming a rolling bearing cage, the rolling bearing cage consisting of a steel strip, the steel strip having defined therein a plurality of openings, with each opening configured to receive one rolling body therein, wherein the steel strip is shaped into a ring after the openings are formed therein;
    heating the steel ring to a temperature above a predetermined minimum temperature required for thermal coating the ring with a powder consisting of a thermoplastic polymer, wherein the heating is performed by an alternating field of an induction coil formed in an annular manner and arranged concentrically inside the steel ring;
    dipping the steel ring into a fluidized bed containing the powder for a predetermined period of residence time;
    during the residence time of said dipping:
        coating the heated steel ring with a continuous coating by causing the heated steel ring to melt a portion of the powder adjacent the steel ring in the fluidized bed such that the melted portion of powder adheres to the dipped surface of the steel ring and forms the continuous coating disposed thereon;
        shaking the steel ring to avoid local accumulation of the powder on the steel ring; and
    removing the coated steel ring from the fluidized bed at the expiration of the residence time.

2. The process of claim 1, further comprising resting the heated steel ring for a predetermined period of resting time prior to said dipping so as to permit the temperature of the heated steel ring to become uniform throughout a volume of the ring, wherein the heated and rested steel ring maintains a temperature above the minimum required coating temperature at an end of the period of resting time; and wherein, during said dipping, the entire steel ring is immediately introduced into the fluidized bed for the predetermined period of residence time.

3. The process of claim 1, further comprising, prior to said forming the steel strip into the shape of a ring, first forming a plurality of openings in a planar steel strip by at least one of a punching, cutting, or boring operation.

4. The process of claim 1, further comprising, shaking the steel ring in a heating zone during said heating step.

5. The process of claim 1, wherein each of the plurality of openings in the steel ring are circular and configured to receive a ball bearing.

6. The process of claim 1, wherein the thermoplastic polymer is polyamide.

7. The process of claim 1, wherein the continuous thermoplastic coating formed on the steel ring has a thickness of between about 0.4 mm and about 1.3 mm.

8. The process of claim 1, wherein the powder in the fluidized bed is made of polyether ketone.

* * * * *